S. T. LAMB.
Car-Couplings.
No. 146,917.  Patented Jan. 27, 1874.
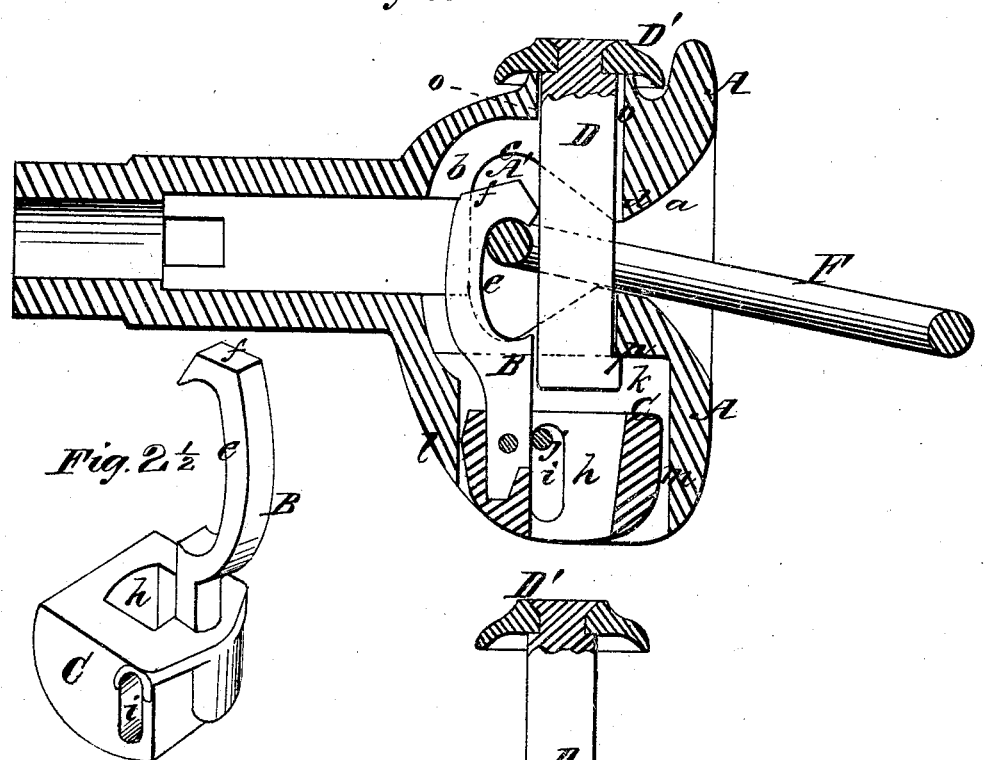
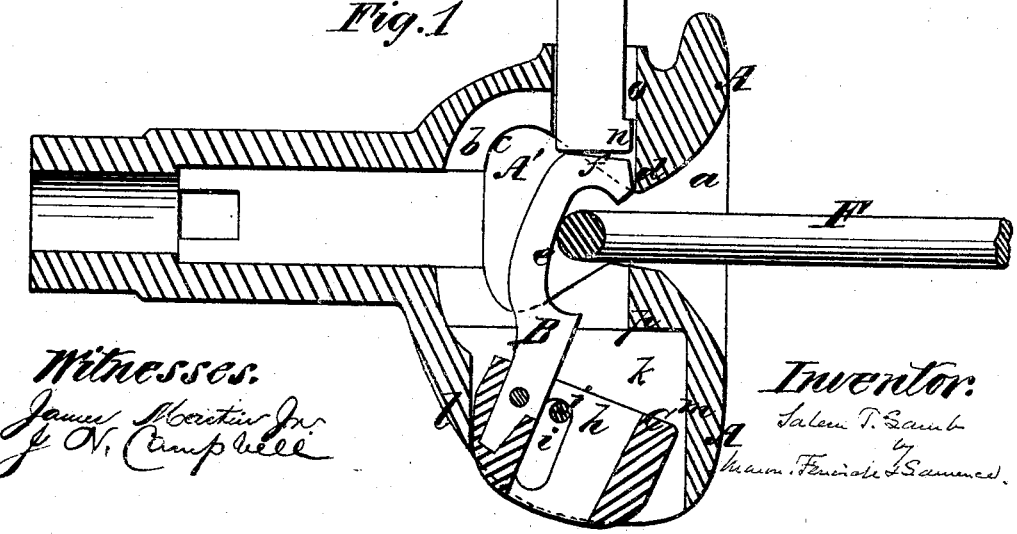

S. T. LAMB.
Car-Couplings.
No. 146,917.
Patented Jan. 27, 1874.
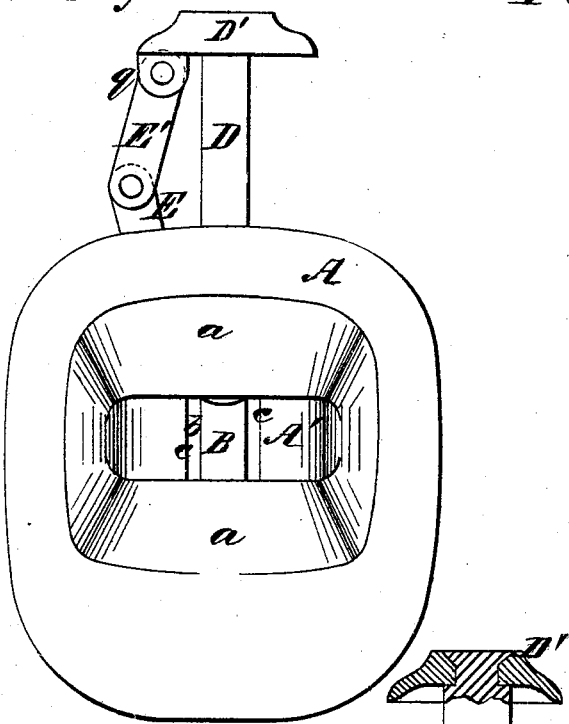
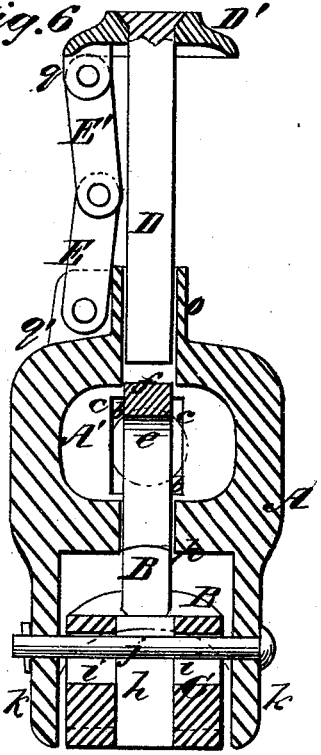
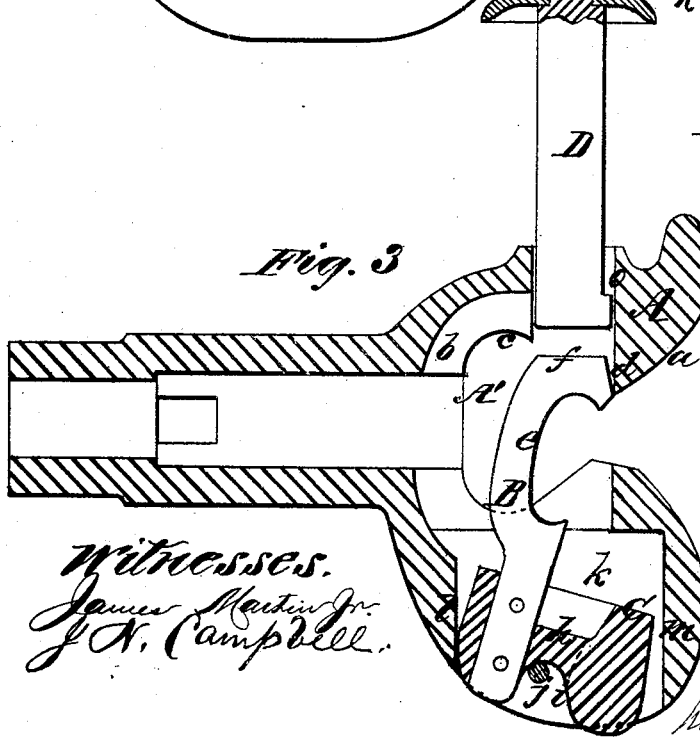
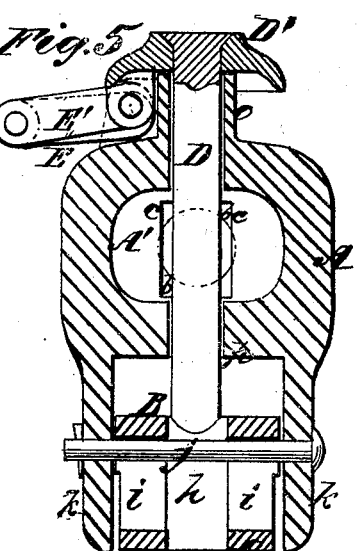

S. T. LAMB.
Car-Couplings.
No. 146,917.
3 Sheets--Sheet 3.
Patented Jan. 27, 1874.
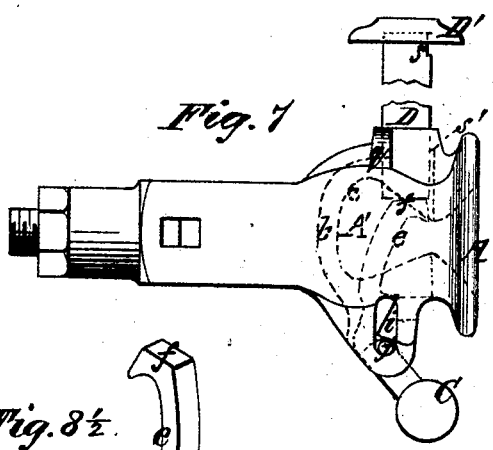
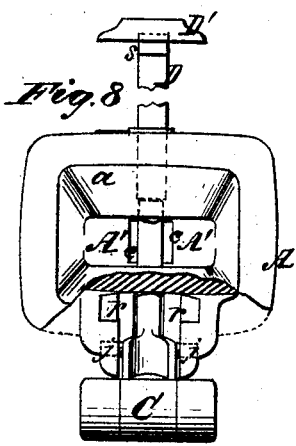
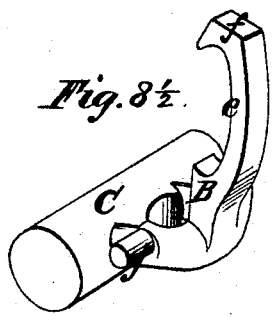
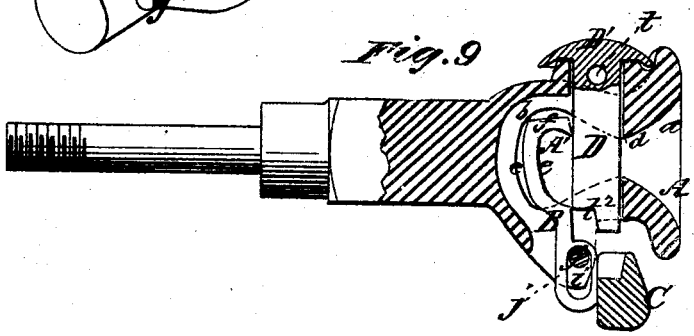
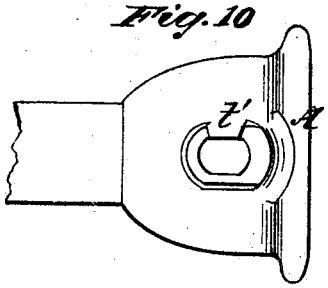
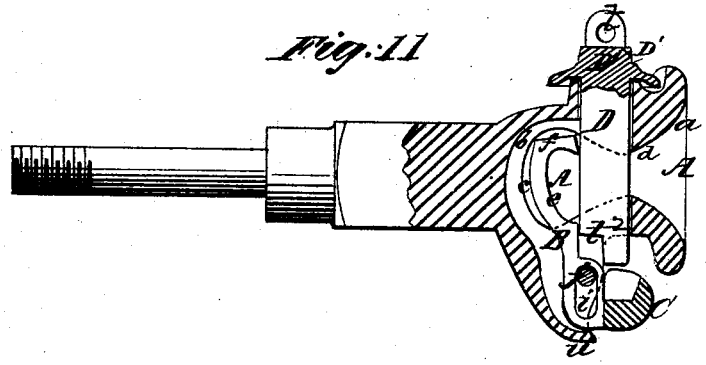
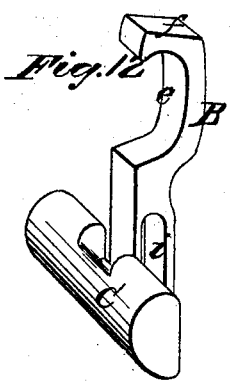
Witnesses.
James Martin Jr.
J. N. Campbell.
Inventor.
Salem T. Lamb
by
Mason, Fenwick & Lawrence.

UNITED STATES PATENT OFFICE.

SALEM T. LAMB, OF NEW ALBANY, INDIANA, ASSIGNOR TO HIMSELF AND BENJAMIN F. AVERY, OF LOUISVILLE, KENTUCKY.

IMPROVEMENT IN CAR-COUPLINGS.

Specification forming part of Letters Patent No. 146,917, dated January 27, 1874; application filed January 15, 1874.

CASE A.

*To all whom it may concern:*

Be it known that I, SALEM T. LAMB, of New Albany, in the county of Floyd and State of Indiana, have invented a new and useful Improvement in Self Car-Couplings; and I do hereby declare that the following is a full, clear, and exact description of the same, reference being had to the accompanying drawings, making part of this specification, in which—

Figure 1, Plate 1, is a longitudinal section, showing the coupling-pin ready to be tripped or dropped. Fig. 2 is a similar section, showing the pin tripped and down through the link. Fig. 3, Plate 2, is a similar section, showing a slightly-modified trip, the pin being raised entirely free from the trip and held in that position by a self-locking toggle-joint bar, shown in other figures of the drawing. Fig. 4 is a front elevation of the draw-head, showing the pin in the same position as in Fig. 1. Fig. 5 is a vertical cross-section of the same, the pin and trip being in the same position as in Fig. 2. Fig. 6 is a similar section, the pin being in the same position as in Fig. 3. Figs. 7, 8, 9, 10, 11, and 12, Plate 3, are views showing the invention slightly modified in some of its details of construction. Figs. 2½ and 8½ show perspective views of two forms of trips I employ.

The nature of my invention consists, first, a coupling-pin trip, which is hung below the horizontal axis of the draw-head in a peculiar manner, and is constructed to vibrate and to reciprocate, and is also arranged to be protected and supported at its upper end, so as to prevent the passage of the coupling-link over its top, and to adjust and guide the link into an approaching draw-head. The vibratory motion is from and toward the front of the draw-head, and the reciprocating motion is straight up and down, toward and from the top of the draw-head, and the effect of the vibratory motion is to pass the trip under and from under the coupling-pin without lowering its upper end to any great extent, and the effect of the reciprocating motion is to permit the link to vibrate nearly straight up and down in the draw-head while the cars are in motion, and thus render more practicable the use of the trip for holding up the link in the draw-head of one car in a proper position for entering the draw-head of another car when the operation of coupling one car with another is to be performed. The arrangement of the counterbalancing coupling-pin trip upon an axial pin, which is in a straight vertical slot below the horizontal axis of the draw-head, and its hollowed out form on its upper front side, are such that the trip above its axis of vibration is always caused to incline forward, and thus press down upon the link, so as to hold it up when the link is in, and also the upper end of the trip occupies a position above the flaring entrance of the draw-head and directly under the coupling-pin when the pin is up.

Second, in the construction of the draw-head chamber with a deep central channel, which extends from the back of the pin-passage to a position in line with the front of the same, and arranging the trip to swing in this channel between shoulders when struck by the coupling-pin and when reciprocated, and thus be saved from the strain or breakage which would come upon it were not this channel for its retreat and the shoulders for its relief provided.

Third, the construction of the pin with an overhanging or capping head, whose lower edge or base extends down below the frame of the top of the guide, through which the coupling-pin moves, and is isolated at the edge of its cap from the draw-head. This construction insures the descent of the drip of rain, dirt, or other clogging matter outside of said guide.

Fourth, in the construction of the draw-head with an upper front stop, and a lower back support for the trip, in combination with a trip, which is hung to its axial pin by means of a slotted bearing, the slots, in which are wider than the diameter of the said pin, whereby the trip is held up at its upper end, and can move backward and forward in a straight line and find a support to relieve the axial pin when the trip is struck or acted upon violently.

Fifth, in constructing a side, front, and back casing upon the lower part of the draw-head for the purpose of strengthening the draw-head below the base of its link-chamber, and protecting the trip and its counter-balance, and preventing the accumulation of trash or obstructing matter thereon.

Sixth, in constructing the trip with an inclosed channel or passage between the lower end and its counter-balance. By this construction the trip and pin have freedom to work below the base of the draw-head, and the trip and counter-balance are protected from descending dirt, and the weight of the counter-balance is thrown forward of the coupling-pin.

Seventh, in a coupling-pin with a rectangular extension on its front side, in combination with an offset on the front side of the wall of the passage, in which the pin moves up and down. By this combination the upward movement of the coupling-pin is prevented while the cars are pulling against one another.

Eighth, in a self-locking toggle-joint bar for holding up the pin, until it is desired to have it rest down upon the trip or descend through the link. By this very simple contrivance, a very effective means for holding up the coupling-pin of this particular coupling, and any other coupling, is provided, and the use of spring-catches and other devices commonly employed for fastening the lifting-lever are dispensed with, and great ease and convenience are secured in locking the pin up and unlocking it to allow it to descend.

To enable others skilled in the art to make and use my invention, I will proceed to describe the same with reference to the figures.

A is the draw-head; B, the trip; C, is its counter-balance weight; D, the coupling-pin; E E', the toggle-joint self-locking bar; and F the coupling-link. The draw-head is made with a link-receiving chamber, A', which is in its vertical and longitudinal section nearly in form of a heart, and in transverse section is nearly in form of an ellipse. This chamber has a flaring entrance-passage, $a$, and at its back wall has a narrow central channel, $b$, cast in it, said channel being of a depth great enough to permit the trip B of the coupling-pin D to pass into it beyond the front shoulders $c\ c$, which are on each side of said channel. The channel in outline, at its back, corresponds to the interior of the chamber B, and thus the trip of the coupling-pin is free to rise and fall as it vibrates, and after it has receded into the channel. The form of the chamber A' also permits the said trip to move up and down, and forms a front stop, $d$, to arrest it as it is thrown over by the counter-balance on its lower end. The trip B is made concavo-convex, as at $e$, at its upper end, in order to form a rest, $f$, for the coupling-pin, and an overhanging hook or catch with which to take hold of and bear down upon the link F, as illustrated in Fig. 2. This trip has a horizontal front extended portion, C, which is made very heavy, as compared with the weight of the vertical portion of the trip, and its purpose is to serve as a counter-balance to the trip, and keep the trip always in the position shown in Fig. 1, when the pin is up, and also to keep said portion of the trip in contact with the link when the pin is down, as in Fig. 2. The counter-balance is made hollow, as at $h$, and slotted, as at $i$, and it, with the portion B, is connected to the draw-head by means of a stationary pivot, $j$, which is smaller than the width of the slot $i$, and passes through two vertical extensions or jaws, $k$, of the draw-head, and through the slot $i$, as shown. It will be seen that the lower surface of the trip is slightly rounded, and that the back portion fits snugly against a shoulder, $l$, of the draw-head, and its sides play loosely between the jaws $k$. By this construction the trip has freedom to vibrate and play up and down, and when the link strikes it the pivot will be relieved by the weighted portion C bearing against the shoulder $l$, while the portion B will recede into the channel $b$, and the further force of the link will be received by the shoulders $c\ c$. It will be observed that the jaws $k$ and shoulder $l$, with the front portion $m$ of the draw-head, inclose the weight of the trip, and thus shield it from objects which might tend to interfere with its operation. The weight being hollow permits the coupling-pin to pass into it when the trip rises; also any dirt or obstructions to pass down through it. The coupling-pin D is flat-sided and fitted in a vertical guide, $o$, a little larger than the pin, and on its lower end an offset, $n$, is formed. The head D' of the pin is capping in form, and its lower edge stands lower than the top of the guide, as shown. The offset catches under the shoulder $p$ when the cars are coupled and pulling against each other, and thus the pin is prevented from rising casually out of the link. The cap insures the descent of drip-rain, sleet, or dirt outside of the guide. This is a very useful feature in a car-coupling. The toggle-joint bar E E' is hinged by the link E' to a lug, $q$, on the under side of the cap of the coupling-pin, and, by the link E, to a lug, $q'$, on the top of the draw-head. This bar is so set that it can be bent inward, at its middle joint, inside of its vertical axis, and thus automatically become locked, in which condition it holds up the pin above and in relief from the trip, as shown in Fig. 6. It also can be bent at said joint in a reverse manner, and thus unlocked, in which condition it allows the pin to drop upon the trip, as in Fig. 4, or through the link, accordingly as the draw-head may be constructed, as shown in Fig. 5.

In Fig. 3 of the drawings I have shown the weighted portion C of the trip hollowed out on its under side, and resting on the pivot $j$. In this construction the trip and weight have an up and down and a vibratory movement. In Figs. 7, 8, and 8½ the weighted portion C has the pivot $j$ cast on its sides, and the short pivots thus formed are set in slots $i$ cast through the jaws $k$ of the draw-head. To insert this trip into the draw-head, a T-shaped slot, r, is cast through the front of the draw-head and the portion C, and pivots of the trip inserted through this slot, the short pivots entering and resting in the slots i, as shown. This plan of trip has a vibratory and an up and down movement. The cap-pin shown in Fig. 7 has a depression, s, in its neck, and the draw-head has a shoulder, s', formed on it, under which the shoulder formed by the depression s catches, and thus the pin is prevented from casually rising out of the link while the cars are in motion.

In construction, shown by Figs. 9 and 10, the slot i is in the trip instead of in the weight. The coupling-pin in this construction has a hole, t, through it under its cap, and the guide of the pin has a portion cut away, as at $t^1$. This admits of a lever being used for lifting the pin. The lower end of the pin is notched, as at $t^2$, in order to match the trip and permit the trip to play up and down. The weight is recessed to receive the end of the pin.

In Figs. 11 and 12 the same form of construction of draw-head and trip as is shown in Figs. 9 and 10 is adapted, substantially, excepting that the weight of the trip has a bearing afforded to it, by the draw-head, at u, when the trip is inclined and stands under the coupling-pin. The coupling-pin in this instance has a perforated lug on top of its cap to receive the end of a lifting-lever.

What I claim as my invention, and desire to secure by Letters Patent, is—

1. The vibrating and reciprocating trip B C, pivoted beneath the coupling-pin passage, so that when forward its upper end is protected by the support d, and when back will guide the link into an approaching draw-head, substantially as set forth.

2. The draw-head A, having the recess extending from the back of the coupling-pin round through the back of the chamber, and forward in front of the coupling-pin through the base of the draw-head, in combination with the trip B C, substantially as described.

3. The coupling-pin with the depressed edge of its overhanging cap isolated from the draw-head, substantially as and for the purpose described.

4. The draw-head, with an upper front stop, d, and a lower back supporting-stop, l, in combination with the trip B C, which slides back and forth on its axial pin, substantially as and for the purpose described.

5. The draw-head A, having the strengthening extension casing below its bottom, in combination with a vibrating trip, substantially as and for the purpose set forth.

6. The trip with a passage between its lower end and its counter-balance, whereby the weight is thrown forward of the coupling-pin, and room for said pin and for dirt to pass down is provided, substantially as described.

7. The coupling-pin D, having the depression s, in combination with the draw-head having the shoulder s', substantially as described.

8. The jointed self-locking bar E E' in combination with a coupling-pin, for the purpose set forth.

SALEM T. LAMB.

Witnesses:
J. N. CAMPBELL,
JAMES MARTIN, Jr.